Patented Feb. 15, 1927.

1,618,086

UNITED STATES PATENT OFFICE.

PHILIP J. HESS, SR., OF KOKOMO, INDIANA, ASSIGNOR TO PITTSBURGH PLATE GLASS COMPANY, A CORPORATION OF PENNSYLVANIA.

PROCESS OF MAKING ROUGE.

No Drawing. Original application filed October 30, 1919, Serial No. 334,565, Patent No. 1,446,181, dated February 20, 1923. Divided and this application filed February 1, 1921. Serial No. 441,710.

The invention relates to the manufacture of polishing rouge such as that set forth in my Patent No. 1,446,181, issued Feb. 20, 1923, and of which application the present application constitutes a division. The invention has for its principal objects the provision of an improved process which will give a superior rouge and produce such rouge more quickly and economically than has heretofore been done.

In my process, as well as in those heretofore practiced for the production of rouge for polishing purposes, ferrous sulphate, commonly known as copperas, is employed. The symbol for this material when in crystalline form is $FeSO_4.7H_2O$. The sugar form has also been very extensively employed, in which case the combined water is less.

The method of burning the copperas heretofore has varied considerably. In some cases it was customary for the operators to charge the furnace before quitting at night, leaving a low temperature in the furnace, while others would charge in the morning with a comparatively warm furnace, from 600 to 900° F., the temperature being gradually raised and finally reaching 1600 to 1700° F. The charge was stirred at about thirty minute intervals and the total period of burning was about ten hours. During the burning, the water of crystallization was driven from the copperas and the sulphate converted for the most part into ferric oxide or rouge, $Fe_2O_3$, with the formation also of a variable percentage of basic ferric sulphate, $2Fe_2O_3.5SO_3$. A variable percentage of the ferrous sulphate $FeSO_4$ also generally remained unconverted. As illustrative of the proportions of the above compounds produced by one characteristic calcining operation is the following:

| | Per cent. |
|---|---|
| $Fe_2O_3$ | 65 to 85 |
| $2Fe_2O_3.5SO_3$ | 10 to 30 |
| $FeSO_4$ | 1 to 5 |

In some cases this mixture was washed with water, thus eliminating the soluble basic ferric sulphate and the ferrous sulphate, and leaving only the ferric oxide. In order to use the oxide thus produced, in polishing, it was necessary to mix it with water and add a solution containing ferrous sulphate (ordinarily referred to as acid), such solution being secured by passing steam or water through a mass of copperas. The addition of the solution of sulphate was necessary in order to secure a proper polishing action by the rouge, the function of the solution of sulphate being to maintain the plasticity or stickiness of the rouge. The amount of acid in the mixture was determined by a hydrometer. Care was taken to avoid any excess of the copperas solution because of its tendency to crystallize upon the polishing blocks and cause a marring or "sleaking" of the surface of the glass.

In other cases the mixture produced by the calcining operation was not washed, but after the necessary amount of water for polishing had been added, the acidity of the mixture as produced by the basic ferric sulphate and the ferrous sulphate was tested by a hydrometer, and if the acid content was low a solution of copperas was added, or if the acid content was high some of the liquid was replaced by water.

It will be observed that with either procedure as above described, the polishing mixture contained as its acid content a substantial amount of the ferrous sulphate ($FeSO_4$) solution, such acid content in the first instance being practically all ferrous sulphate solution and in the second case being made up partly of the sulphate solution and partly of the basic ferric sulphate solution.

I have found that the basic ferric sulphate is much more effective in its action as a component of the rouge polishing mixture than the ferrous sulphate. Both compounds tend to give the mixture the necessary stickiness or plasticity to make it effective as a polisher, but the basic ferric sulphate gives greater friction and hence more polishing effect, and will not crystallize till the concentration is very great. The copperas solution, on the other hand, begins to crystallize very readily on concentration and such crystallization tends to form a crust at the edge of the polishing blocks and produce "sleaking" or marring of the polished surface of the glass. The tendency of the mixture to mass or build up on the felts is much less with the basic ferric sulphate than with the copperas solution. My process is therefore directed to the production of mixture in which the acid solution is substantially all provided by the use of the basic ferric sulphate, and in which the ferrous sulphate is reduced to a minimum.

In the practice of my invention the crystalline form of copperas is preferably employed, although the sugar form may be used. This copperas is calcined in a different manner from that heretofore described for the old process, the time of heating being reduced to about four hours and the temperatures employed being relatively much higher. The purpose of this method of calcining or burning is to produce a product which contains a smaller proportion of the ferrous sulphate and a much higher proportion of the basic ferric sulphate. The calcining at a higher temperature and for a shorter period of time produces this result, a characteristic table of proportions being as follows:

|  | Per cent. |
|---|---|
| $Fe_2O_3$ | 65 to 75 |
| $2Fe_2O_3 5SO_3$ | 25 to 35 |
| $FeSO_4$ | .20 |

In the use of this material no copperas water is added, the basic ferric sulphate taking the place of the copperas solution of the old process, so that all that is necessary in the use of this material is to add the necessary amount of water, the mixture being preferably much thicker than that employed with the material produced by the old process. The basic ferric sulphate which goes into solution acts to maintain the plasticity of the mixture and gives it stickiness when used in the polishing operation, and the tendency of the mixture to mass or build up on the felts is reduced to a minimum, so that the mixture can be used throughout almost the entire polishing operation. About one pound of the polishing compound per four and a half gallons (4½) of water has been found to give the best results when the mixture is applied according to my system, but this amount may be varied within certain limits depending on the method of use without departing from the invention. A larger amount of rouge is applied during the first part of the operation than during the concluding portion, but the use of the felts with water alone continues for only a few minutes at the start of the operation. With this mixture the total period of the polishing operation as compared with the operation using the ordinary rouge mixture heretofore described is reduced about 30%, a substantial saving also being effected as to power, rouge and felt, although the power required per unit of time is greater than in the old operation, due to the greater friction produced by the use of the basic ferric sulphate.

In the calcining operation of my process the $FeSO_4$ is reduced to a minimum, which is desirable since its tendency is to crystallize as heretofore referred to, and thus produce marks or "sleaks" on the surface of the glass. The use of the basic ferric sulphate to produce the necessary plasticity and stickiness avoids this difficulty when used in the right proportion. I have found that the proportion above indicated produces the best results although a somewhat lower as well as somewhat higher proportion may be employed. When the proportion of basic ferric sulphate becomes too high, the sulphate may act as a lubricant and thus retard polishing, and when the amount is too low the friction and consequently the polishing effect decreases.

The rouge as produced by my process appears to be somewhat softer than that produced by the old processes, which may have something to do with the better results secured in polishing, but as heretofore stated, I believe that the advantage is primarily due to the action of the basic ferric sulphate in maintaining the plasticity or stickiness of the rouge throughout the polishing operation, whereby the tendency of the material to thicken up or build up and to crystallize is avoided.

The reactions involved in carrying out my calcining operation are believed to be about as follows, the reactions set forth under (3) occurring more or less concurrently:

(1) $FeSO_4 7H_2O$ heat $FeSO_4 H_2O 6H_2O$
(2) $FeSO_4 H_2O$ more heat $FeSO_4 H_2O$
(3) $2FeSO_4$ more heat $Fe_2O_3 SO_3 SO_2$

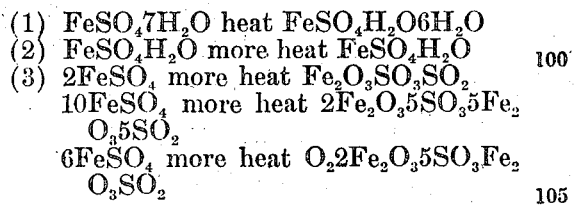

If the heat were continued long enough the basic ferric sulphate would be converted into ferric oxide, but the heat is applied, as heretofore stated, so as to get the proper proportions of the oxide and sulphate. A small proportion of the $FeSO_4$ (about two-tenths per cent) remains undecomposed, as heretofore indicated in the table showing the proportions of the compounds after calcining.

In burning the copperas, the oven is first brought to high temperature, 1600 to 1700° F., and the copperas is then charged. The temperature then falls, due to the cooling effect of the charge, to about 900 to 1000° F., and the heating continues, the temperature reaching 1600° F. within two and one-half hours. From this time on the temperature is raised to 1700 to 1800° F. The whole calcining operation requires about four hours and the charge is stirred or worked about three times during the entire calcination.

While the foregoing constitutes the preferred method of operation, I have found that substantially the same results may be obtained if the furnace is maintained at a somewhat higher temperature, in which case, however, the time of burning should be decreased. By increasing the temperature the time of calcining may be reduced to the neighborhood of three hours. The time of burning may also run somewhat over four hours if the temperatures are employed below those stated. The time is also somewhat dependent upon the size of the charge, the character of the furnace, and other conditions, so that the invention is not limited to the precise periods or temperatures specified heretofore.

What I claim is:

1. The process of preparing a polishing rouge mixture which consists in heating ferrous sulphate until the water of crystallization is driven off and substantially all of the sulphate changed into a compound comprising ferric oxide and basic ferric sulphate, in the approximate proportion of two parts by weight of oxide to one of sulphate, and then mixing the compound with water in the approximate proportions of one pound of the compound per four and one half gallons of water.

2. The process of preparing polishing rouge mixture which consists in heating ferrous sulphate until the water of crystallization is driven off and substantially all of the sulphate changed into a compound comprising ferric oxide and basic ferric sulphate, and then mixing with water in the approximate proportions of 3.7 to 5.3 gallons of water per pound of compound.

3. The process of preparing a polishing rouge mixture which consists in charging ferrous sulphate into an oven heated to a temperature upward of 1400° F. and after such charging and consequent lowering of the temperature of the furnace, raising the temperature to upward of 1400° F., and then mixing the compound with water the total time of heating being between three and five hours, and the material being stirred at intervals.

4. The process of preparing a polishing rouge mixture which consists in charging ferrous sulphate into an oven heated to a temperature of 1600 to 1700° F., and after such charging, bringing the temperature of the furnace up to 1700 to 1800° F., and then mixing the compound with water the total time of heating being approximately four hours.

In testimony whereof, I have hereunto subscribed my name this 26th day of January, 1921.

PHILIP J. HESS, Sr.